(12) United States Patent
Sun et al.

(10) Patent No.: US 10,025,528 B2
(45) Date of Patent: Jul. 17, 2018

(54) MANAGING TRANSFORMATIONS OF SNAPSHOTS IN A STORAGE SYSTEM

(71) Applicant: Delphix Corporation, Menlo Park, CA (US)

(72) Inventors: Hubert Ken Sun, Menlo Park, CA (US); Christopher G. Siden, San Francisco, CA (US); Kyle Cackett, Berkeley, CA (US)

(73) Assignee: Delphix Corporation, Redwood City, CA (US)

( * ) Notice: Subject to any disclaimer, the term of this patent is extended or adjusted under 35 U.S.C. 154(b) by 0 days.

(21) Appl. No.: 15/411,476

(22) Filed: Jan. 20, 2017

(65) Prior Publication Data

US 2017/0206017 A1    Jul. 20, 2017

Related U.S. Application Data

(60) Provisional application No. 62/281,126, filed on Jan. 20, 2016, provisional application No. 62/281,127, filed on Jan. 20, 2016.

(51) Int. Cl.
*G06F 3/06* (2006.01)
*G06F 17/30* (2006.01)

(52) U.S. Cl.
CPC .......... *G06F 3/065* (2013.01); *G06F 3/0604* (2013.01); *G06F 3/067* (2013.01); *G06F 3/0664* (2013.01); *G06F 17/30569* (2013.01)

(58) Field of Classification Search
None
See application file for complete search history.

(56) References Cited

U.S. PATENT DOCUMENTS

| | | |
|---|---|---|
| 8,150,808 B2 | 4/2012 | Zha et al. |
| 8,548,944 B2 | 10/2013 | Yueh |
| 9,396,074 B2 | 7/2016 | Stewart et al. |
| 2016/0224797 A1 | 8/2016 | Schrock et al. |

*Primary Examiner* — Kevin Verbrugge
(74) *Attorney, Agent, or Firm* — Fenwick & West LLP

(57) ABSTRACT

A storage system executes transform scripts to transform data stored in a source snapshot to obtain transformed snapshot. A transform script may be used to upgrade data stored in a snapshot from a version of an application to a newer version of the application. The storage system stores intermediate snapshots during execution of a transform scripts. The storage system reuses data stored during execution of transform scripts to optimize execution of newer transform scripts. For example, the storage system identifies a previously executed transform script having a matching prefix of transform operations and reuses an intermediate snapshot obtained by executing the matching prefix. The storage system processes the intermediate snapshot by executing the remaining transform operations of the new transform script.

20 Claims, 8 Drawing Sheets

MANAGING TRANSFORMATIONS OF SNAPSHOTS IN A STORAGE SYSTEM

CROSS REFERENCES TO RELATED APPLICATIONS

This application claims the benefits of U.S. Provisional Application No. 62/281,127, filed on Jan. 20, 2016 and U.S. Provisional Application No. 62/281,126, filed on Jan. 20, 2016, each of which is incorporated by reference in its entirety.

BACKGROUND

This invention relates to managing storage systems in general and in particular, to transforming data stored in snapshots in a storage system.

Data stored in file systems or database systems is often transformed for various reasons. For example, the data stored in a file system may be processed by a particular version of an application. A new version of the application may be configured to process data in a different format. Accordingly, the data stored in the file system may be transformed to change the format of the data to allow the data to be processed by the new version of the application. Accordingly, the data of these fields may have to be transformed to conform to the requirements of the new version of the software.

Such transformation is typically performed using instructions or commands stored in a script. Several application and systems, for example, database systems are often complex and require help from experts for development and testing of the transform script as well as for managing execution of the transform scripts. Execution of such transformations is further complicated by the fact that the system may be a production system that is constantly being used. Execution of these transformations may require the system to be made unavailable for significant periods of time. Enterprises typically cannot afford to take production systems offline for long periods of time. As product release cycles shorten, transformation of data is required more often. As a result, conventional techniques for performing transformations are often expensive and take significant amount of time and resources.

SUMMARY

To address the needs unmet by existing storage technologies, embodiments perform transformations of data stored in a storage system. The storage system stores a plurality of source snapshots. A snapshot shares data blocks with other snapshots thereby allowing efficient storage of data as well as efficient creation of new snapshots. The storage system receives a source transform script for transforming data of a source snapshot. For example, the transform script may be used to transform data having a format compatible with a version of an application to change the format of the data to be compatible with a later version of the application. As another example, the transform script may be used to transform data having a format compatible with an application offered by a vendor to change the format of the data to be compatible with a corresponding application offered by a different vendor. The storage system may execute multiple transform scripts. For example, during development phase of a transform script, a developer may make incremental modifications to a transform script. Each incremental modification changes the transform script and may require execution of the modified transform script, for example, for testing the modified transform script.

The transform script comprises a sequence of transform operations. The transform script may specify the order in which the instructions or the transform operations need to be executed. Accordingly, the transform script may be considered an ordered set or a sequence of instructions or transform operations. The storage system processes data of a snapshot using a script by executing the transform operations in the order specified by the transform script. The storage system stores intermediate snapshots during execution of the transform script. For example, the storage system may store an intermediate snapshot after execution of one or more transform operations and then use data of the stored intermediate snapshot as input for the next set of transform operations.

The storage system receives a new transform script for processing data of the source snapshot. The new transform script includes a new sequence of transform operations. The storage system identifies a previously executed transform script that has a sequence of transform operations with a matching prefix with the new sequence of transform operations. The storage system identifies an intermediate snapshot saved after executing the transform operations of the matching prefix for the previously executed transform script. The storage system executes the transform operations of the new sequence that occur after the matching prefix using the identified intermediate snapshot. The storage system provides the result of execution of the remaining transform operations as the result of the new transform script.

The features and advantages described in this summary and the following detailed description are not all-inclusive. Many additional features and advantages will be apparent to one of ordinary skill in the art in view of the drawings, specification, and claims.

Figure 1:
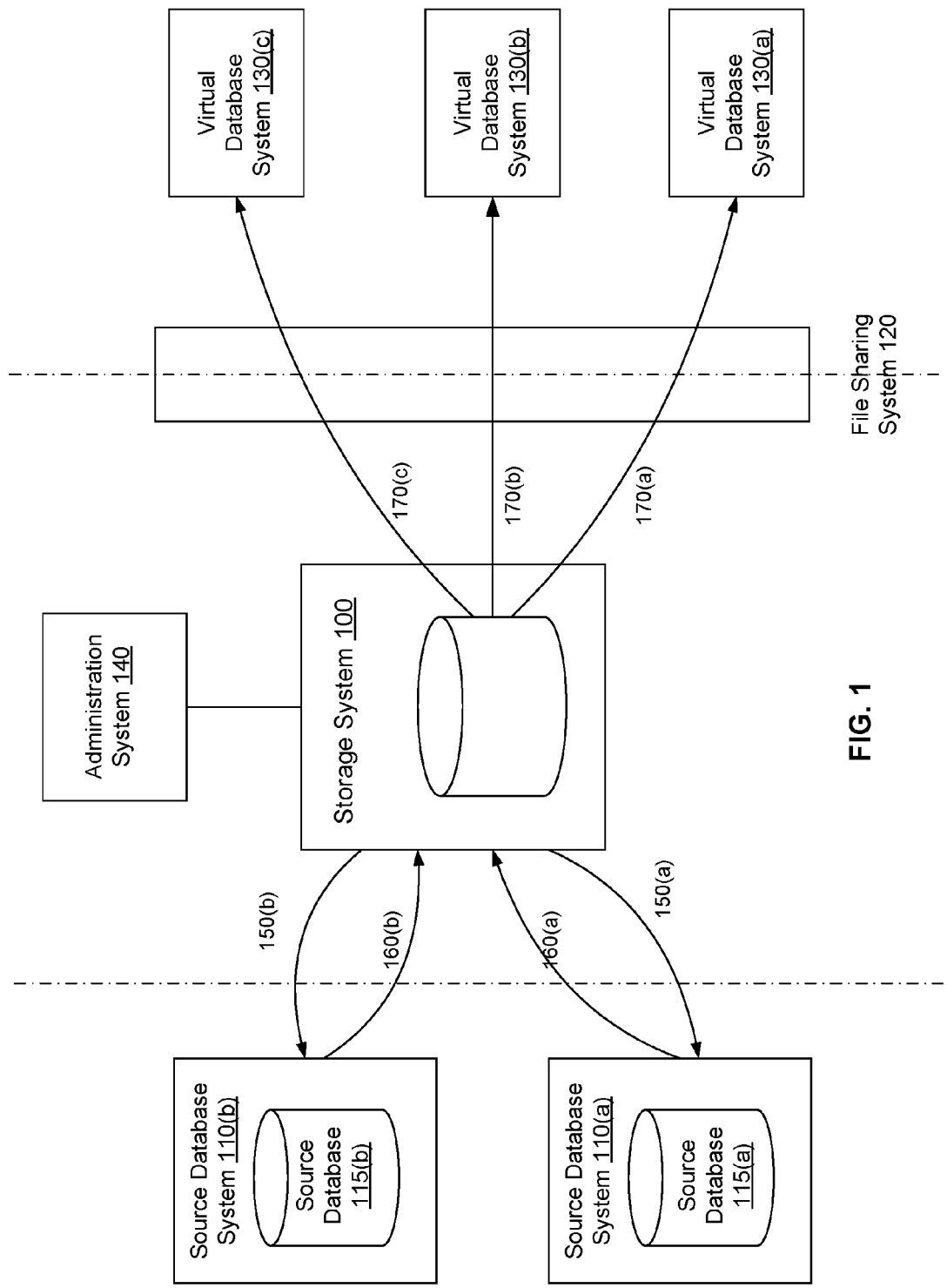
FIG. 1 is diagram illustrating copying of information from a source database to a storage system for provisioning as virtual databases, according to an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments manage transformations of data stored as snapshots in a storage system. In particular, embodiments allow efficient transformations of data stored in snapshots. The snapshots may represent point-in-time copies of data received from another system, for example, a production database system. A snapshot may share data blocks with other snapshots. For example, a child snapshot may be created from a parent snapshot and may share all data blocks of the parent snapshot. The data of the child snapshot may be modified. Virtual databases may be created from data stored in snapshots. Techniques disclosed herein may be used to transform data stored in virtual databases. Virtual databases share database blocks with other virtual databases. Virtual databases can be used to perform transform operations on snapshots if the snapshot stores data using a database format. For example, transform operations expressed using database commands can be executed on virtual databases.

Virtual Databases

Storage systems store multiple point-in-time copies of a source database using snapshots. Sharing of data blocks across snapshots allows efficient storage of the point-in-time copies of the source database. Virtual databases corresponding to points in time of the source database are provisioned using the storage system. Virtual database systems are described in U.S. patent application Ser. No. 12/603,541 filed on Oct. 21, 2009, now issued as U.S. Pat. No. 8,150,808, which is incorporated by reference herein in its entirety. Storage systems may be used for other purposes, for example, for storing point in time copies of file systems for purposes of taking backups of file systems. Backup systems based on stored snapshots of data are described in U.S. patent application Ser. No. 13/183,131 filed on Jul. 14, 2011, now issued as U.S. Pat. No. 8,548,944, which is incorporated by reference herein in its entirety.

A virtual database created for a point in time is stored as a set of files that contain the information of the database as available at that point in time. Each file includes a set of database blocks stored in a snapshot and the data structures for referring to the database blocks. A database block is a data block that conforms to a format of a database and can be processed by a database system. For example, a database block may include metadata describing data of the data block. Database blocks corresponding to database system offered by different vendors may conform to different formats. A virtual database may be created on a database server by creating the database files for the source database corresponding to the state of the source database at a previous point in time, as required for the database server.

The files of the virtual database are made available to the database server using a file sharing mechanism, which links the virtual database to the appropriate database blocks stored on the storage system. The process of making the virtual database available to a database server is called "provisioning" the virtual database. Multiple virtual databases can be provisioned based on the state of the source database at the same point in time.

FIG. 1 is a diagram illustrating copying of information from a source database to a storage system for provisioning as virtual databases, according to an embodiment of the invention. The source database systems 110 manage data for an organization. The storage system 100 retrieves data associated with databases from one or more source database systems 110 and stores the data in an efficient manner, further described below. A database administrator user interface allows a database administrator to perform various actions supported by the storage system 100.

In response to a request from the administration system 140, or based on a predefined schedule, the storage system 100 may send a request 150 for data to a source database system 110. The source database system 110 responds by sending information stored in the source database as a stream of data 160. The request 150 is sent periodically and the source database system 110 responds by sending information representing changes of data stored in the source database since the last response 160 sent by the source database system 110. The storage system 100 receives the data 160 sent by the source database system 110 and stores the data. The storage system 100 stores the information efficiently, for example, by keeping versions of database blocks that have changed and reusing database blocks that have not changed.

To create a virtual database, the storage system 100 creates files that represent the information corresponding to the source database system 110 at a given point in time. The storage system 100 exposes 170 the corresponding files to a virtual database system 130 using a file sharing system 120. The virtual database system 130 runs a database server that can operate with the files exposed 170 by the storage system 100. Hence, a virtual copy of the source database is created for the virtual database system 130 for a given point in time in a storage efficient manner.

A database block may be shared between different files, each file associated with a different virtual database. In particular, a database block is shared if the corresponding virtual database systems 130 are only reading the information in the database block and not writing to the database block. In one embodiment, the virtual database manager 330 makes copies of the database blocks only if necessary. For example, a particular database block may be shared by multiple virtual databases that read from the same database block. But if one of virtual database systems 130 attempts to write to the database block, a separate copy of the database block is made because the writing operation causes that database block to be different for the virtual database corresponding to that virtual database systems 130 than it is for the other virtual databases.

Executing Transform Scripts

Figure 2:
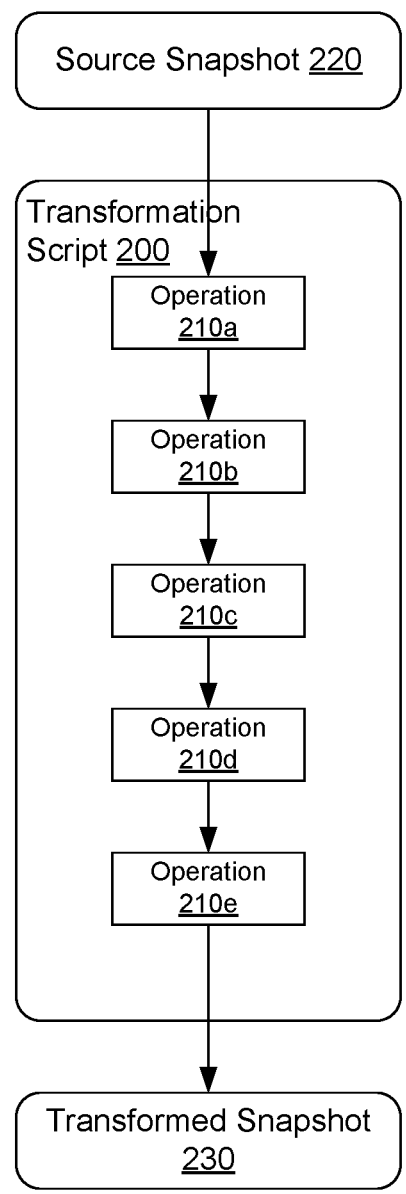
FIG. 2 illustrates transformation of a source snapshot to a transformed snapshot by executing a transform script, according to an embodiment of the invention.

FIG. 2 illustrates transformation of a source snapshot to a transformed snapshot by executing a transform script, according to an embodiment of the invention. The storage system allows users to specify a transform script 200 as a sequence of transform operations 210. A transform operation is also referred to herein as operations, transformations, or transformation operations and a transform script is also referred to as a transformation script. FIG. 2 shows a transform script as a sequence of transform operations 210a, 210b, 210c, 210d, and 210e. The storage system 100 receives information identifying a source snapshot 220 for being transformed using the transform script. The storage system executes the various transform operations 210 of the transform script 200 in the order in which the transform operations are specified in the transform script 200. The storage system generates a transformed snapshot 230 as a result of executing the transform script on the source snapshot 220. Each transform operation 210 represent a particular computation for transforming data or a set of instructions configured to transform data. A transform operation may comprise a set of instructions that process the data of the snapshot.

The storage system may execute transform scripts for performing various types of data transformations. The storage system may execute a transform script for porting data of a file system (or a database) from one operating system to another operating system. For example, an operating system O1 may store data in little endian format and another operating system O2 may store data using big endian format. The storage system 100 may store a snapshot comprising data stored in a file system processed using operating system O1. The storage system 100 transforms the snapshot to generate a transformed snapshot that can be processed using operating system O2. The corresponding transform operation performs byte swapping operations on the data stored in the source snapshot to convert data represented in little endian format to data represented in big endian format (or vice versa).

The storage system may execute a transform script to transform data of a snapshot or a VDB processed using a version V1 of an application to become compatible with a different version V2 of the application. For example, a virtual database may store data that is compatible with a particular version of a database system provided by a vendor. The storage system 100 transforms data of that virtual database to become compatible with a newer version of the database or application. The transformed data is stored in a transformed VDB that can be processed by the newer version of the database. Accordingly, the transform script allows upgrade of virtual databases or data processed by any application. The transform script for an upgrade operation may be specific to the application or system that processes the data stored in the source snapshot. For example, vendors of an application or system may specify upgrade operations to be performed to be able to use a newer version of the application or system. The transform script represents these upgrade operations.

The techniques disclosed herein may be used to execute a transform script that allows cross database (or cross application) migration. For example, the storage system 100 may store data in a virtual database or snapshot that is compatible with a database system or application offered by a vendor X. The storage system 100 receives and executes a transform script that transforms the data of the virtual database or snapshot to generate a transformed VDB or snapshot that is compatible with a database system or application offered by a different vendor Y. Accordingly, the transform script allows the storage system 100 to perform a cross database migration or cross application migration.

A transform script may mask various portions of data stored in a source snapshot to generate a snapshot storing masked data. For example, a table of a virtual database may store sensitive information such as credit card numbers and a transform operation may be used to mask the sensitive information stored in the table. The transformation operation generates a masked virtual database that can be provided to developer or testers for debugging certain issues in a source database.

Although the techniques disclosed herein are illustrated using snapshots, the techniques are applicable to other entities such as virtual databases and point-in-time copies of source systems stored in snapshots.

System Architecture

Figure 3:
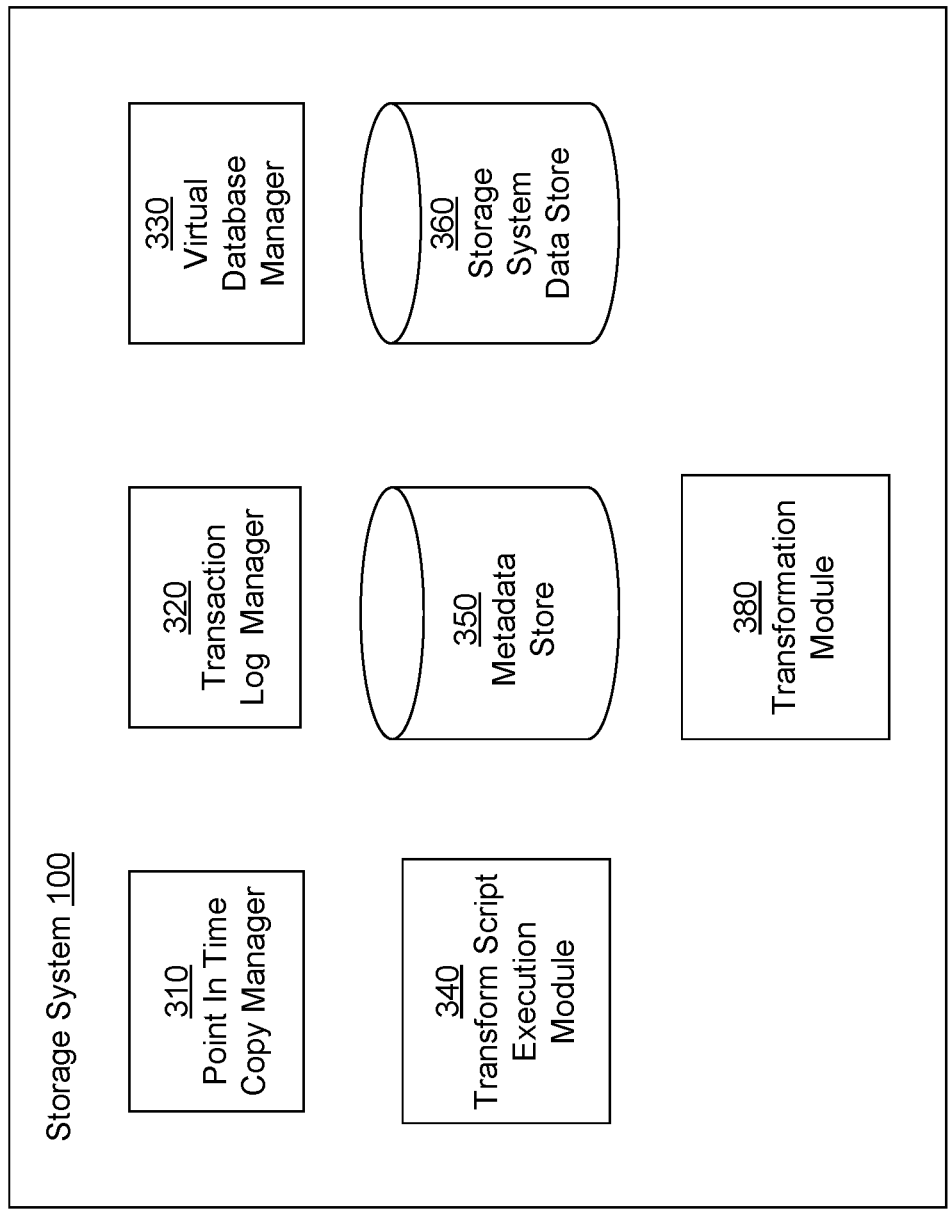
FIG. 3 illustrates the architecture of a storage system for managing transformations of snapshots, in accordance with an embodiment of the invention.

FIG. 3 illustrates the architecture of a storage system for managing transformations of snapshots, in accordance with an embodiment of the invention. The storage system 100 includes a point-in-time copy manager 310, a transaction log manager 320, a virtual database manager 330, a metadata store 350, a transform script execution module 340, a storage system data store 360, and a transformation module 380. In alternative configurations, different and/or additional modules can be included in the storage system 100. Furthermore, functions performed by a particular module may be performed by other modules than those indicated herein.

The point-in-time copy manager 310 interacts with a source database system 110 (or a source system) by sending a request to the source database system 110 to retrieve information representing a point-in-time copy of the source database 115 (or data of the source system). The point-in-time copy manager 310 stores the data obtained from the source database 115 in the storage system data store 360. The data retrieved by the point-in-time copy manager 310 corresponds to database blocks (or pages) of the database being copied from the source database. After a first point-in-time copy request to retrieve information stored in source database 115, a subsequent point-in-time copy is received in a second request. The data collected in the first request is combined with the data collected in a second request to reconstruct a copy of the source database corresponding to a point in time at which the data was retrieved from the source database 115 for the second request.

The transaction log manager 320 sends request to the source database system 110 for retrieving portions of the transaction logs stored in the source database system 110. The data obtained by the transaction log manager 320 from the source database system 110 is stored in the storage system data store 360. In one embodiment, a request for transaction logs retrieves only the changes in the transaction logs in the source database system 110 since a previous request for the transaction logs was processed. The database blocks retrieved by a point in time copy manager 310 combined with the transaction logs retrieved by the transaction log manager 320 can be used to reconstruct a copy of the source database corresponding to times in the past in between the times as which point-in-time copies are made.

The virtual database manager 330 receives requests for creation of a virtual database for a virtual database system 130. The request for creation of a virtual database may be sent by a database administrator using the administration system 140 and identifies a source database system 110, a virtual database system 130, and includes a past point-in-time corresponding to which a virtual database needs to be created. The virtual database manager 330 creates the necessary files and data structures corresponding to the virtual database being created and shares the files with the virtual database system 130. The database administrator for a virtual database system 130 may be different from a database administrator for the source database system 110.

The storage system data store 360 stores data obtained from the source database systems 110. The storage system data store 360 stores various point-in-time copies associated with different points in time obtained from the source database systems 110. The point-in-time copies of a source database may share database blocks. For example, if a database block does not change between two points in time T1 and T2, the point-in-time copies associated with T1 and T2 may share the database block. The storage system data store 360 also stores transaction logs obtained from the source database systems 110. The storage system data store 360 stores data structures representing virtual databases created by the storage system 100.

A point in time copy of a source system is stored as a snapshot. A snapshot may share data blocks with other snapshots. For example if a snapshot S1 is created as a child of snapshot S2, snapshot S2 shares data blocks with S1. The snapshots S1 and S2 share data blocks that were not modified in any one of S1 or S2.

The metadata store 350 stores metadata describing snapshots. In particular, the metadata store 350 stores the time at which each snapshot is created. The metadata store 350 maintains parent-child relationships between snapshots. If the storage system 100 creates a snapshot S1 corresponding to data received from a source database system and subsequently, creates the next snapshot S2 based on the subsequent set of data received from the source database (without any snapshots created in between S1 and S2 based on data received from the source database), the snapshot S1 is a parent of snapshot S2 and correspondingly snapshot S2 is a child of snapshot S1.

The relationships between the snapshots are represented as a graph in the metadata store 350. The graph comprises nodes and edges between nodes representing relationships between the nodes. An entity may be a snapshot or a point-in-time copy of a source database, or a virtual database. The metadata store 350 stores different types of edges. For example, the metadata store 350 stores associations between source snapshots and transformed snapshots allowing the storage system 100 to identify the source snapshot used to create a transformed snapshot. In an embodiment, the metadata store 350 store a graph for representing parent-child relationships between source snapshots and another graph for representing parent-child relationships between transformed snapshots.

The transformation module 380 transforms data stored in a source snapshot by applying transform operations to the data and creating a transformed snapshot. A transformed snapshot created by transforming data of a source snapshot may share data blocks with the source snapshot. For example, if only a portion of data of the source snapshot is transformed, the transformed snapshot may share data blocks that store data that is not transformed.

An example of a transform operation is a masking function applied for obfuscating data. This may include, but is not limited to, masking out digits, replacing names from a dictionary, or mathematical transformations. As an example, the transformation module 380 performs masking by replacing either a portion of a number (i.e., a string of digits) with one or more characters. For example, if a number represents a social security number or a credit card number, the transformation function may replace a prefix of the number with a character, such as 'x'. Accordingly, the transformation module 380 replaces a number "123 456" with "xxx 456."

In an embodiment, the transformation module 380 performs masking by using a dictionary to map a term to another term. A dictionary may provide mappings from names people to different names. For example, the transformation module 380 may use a dictionary to replace all occurrences of "Mark" with "Michael", all occurrences of "Mary" with "Nancy" and so on. The transformation module 380 may mask numbers by performing certain mathematical transformation. For example, each digit may be replaced by the next digit in order of increasing value, such as replacing 0 by 1, 1 by 2, 2 by 3, 3, by 4, and so on and replacing 9 by 0. Accordingly, number "239" is replaced by "340". These are examples of masking functions and various other masking functions may be used by the transformation module 380. For example, the transformation module 380 may use cryptographic functions that map a value to another value from which decrypting the original value is not possible.

As described above, the transformation module 380 masks data for creating secure snapshots. In an embodiment, the database storage system invokes the transformation module 380 to mask the sensitive data obtained from a source database. The database storage system creates a VDB from a snapshot and the transformation module 380 executes one or more database commands, for example SQL (structure query language) commands to replace data of the VDB with masked data. For example, if a database table T1 of the VDB includes a column credit_card_number storing sensitive data, the data of the column may be masked by executing a command "update T1 set credit_card_number=masking_function(credit_card_number, seed)" where "seed" is an input seed value used by the masking function.

The transform script execution module 340 executes a transform script on the data of a source snapshot. The transform script execution module 340 executes the sequence of transform operations identified in the transform script in the order specified by the transform script. The transform script execution module 340 saves intermediate snapshots while executing a transform script. For example, the transform script execution module 340 may save an intermediate snapshot after executing each transform operation specified in the transform script or after executing each set of consecutive transform operations, wherein each set includes one or more transform operations.

In an embodiment, the transform script execution module 340 tracks a metric indicative of the amount of computations that occurred since the last intermediate snapshot was saved. In an embodiment, the metric is based on the time since the previous intermediate snapshot was saved. In an embodiment, the metric considers the amount of computation resources used, for example, the number of processors used. If the transform script execution module 340 compares the measure of the amount of computations after each transform operation with a threshold value. If the transform script execution module 340 determines that the value of the metric is above the threshold value, the transform script execution module 340 saves an intermediate snapshot and resets the value of the metric.

Execution of Transform Scripts

Embodiments of the invention save intermediate snapshots during execution of transform scripts. If the transform script execution module 340 receives a transform script, the transform script execution module 340 executes the received transform script in an efficient manner by reusing data of an intermediate snapshot saved during execution of a previous transform script.

Figure 4:
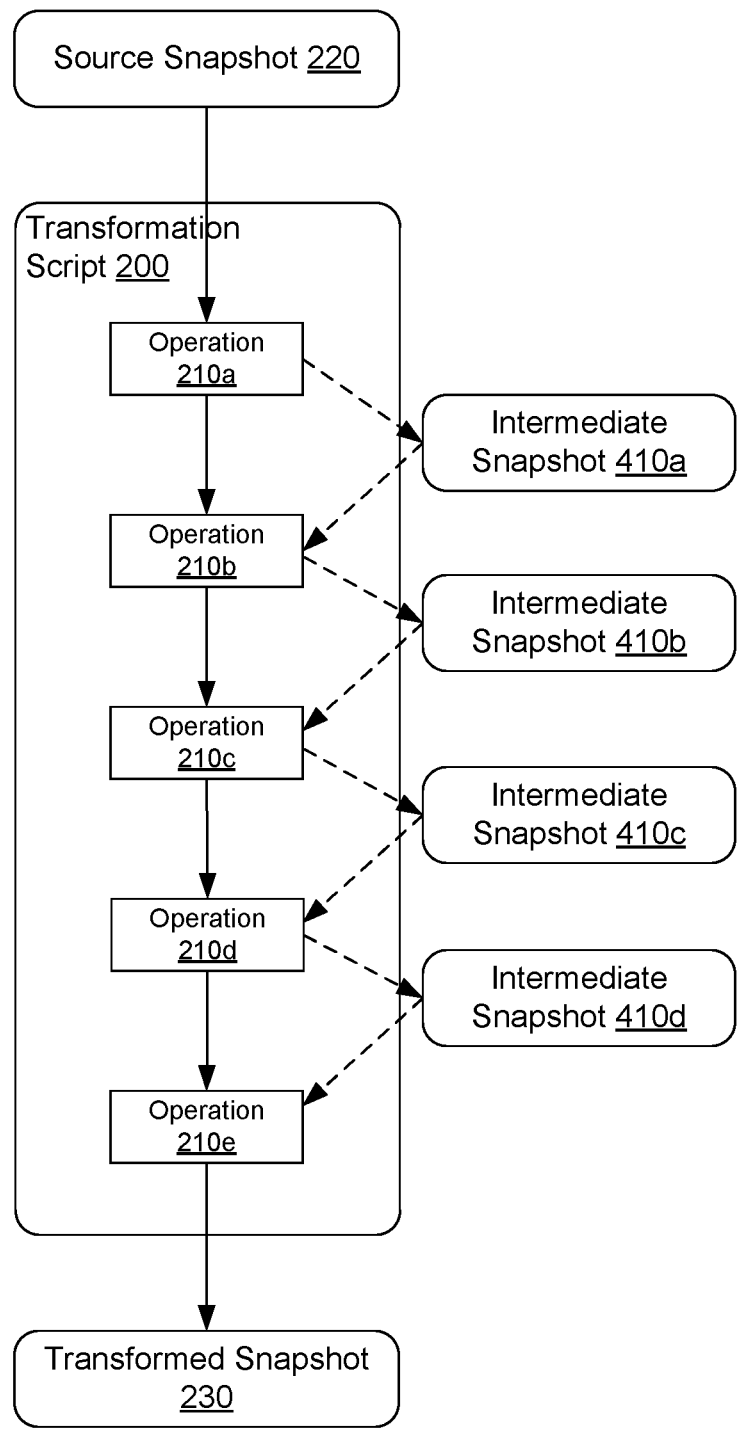
FIG. 4 illustrates the process of transforming a snapshot by generating intermediate snapshots during execution of a transform script, according to an embodiment of the invention.
Figure 5:
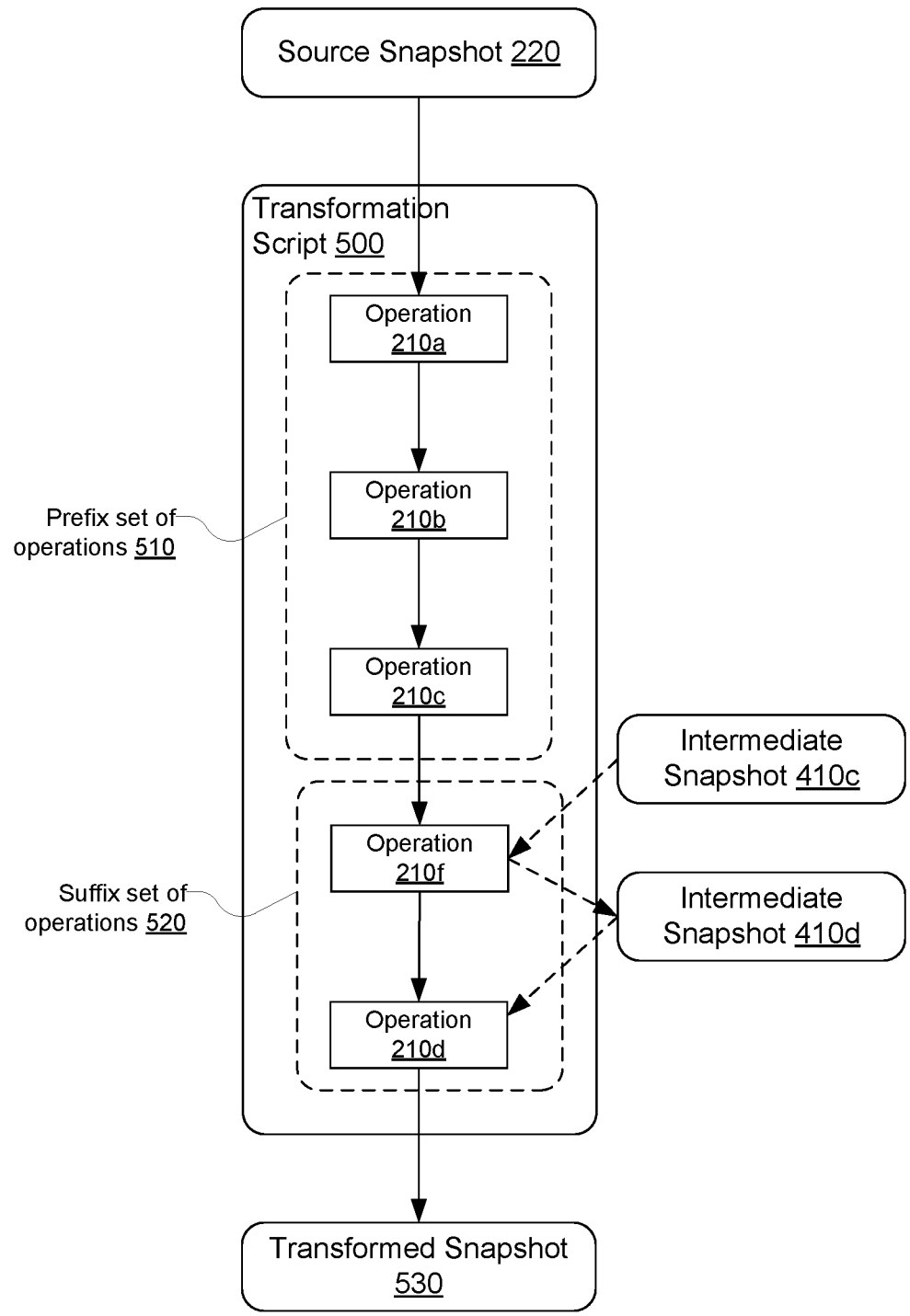
FIG. 5 illustrates the process of executing a modified transform script using an intermediate snapshot, according to an embodiment of the invention.

FIG. 4 illustrates the process of transforming a snapshot by generating intermediate snapshots during execution of a transform script, according to an embodiment. As shown in FIG. 5, the transform script execution module 340 executes the transform script 200 illustrated in FIG. 2 to transform the source snapshot 220. The transform script execution module 340 saves intermediate snapshots 410 during execution of the transform script. As shown in FIG. 4, an intermediate snapshot is saved after each transform operation. For example, intermediate snapshots 410a is saved after transform operation 210a, intermediate snapshots 410b is saved after transform operation 210b, intermediate snapshots 410c is saved after transform operation 210c, and intermediate snapshots 410d is saved after transform operation 210d. The result of execution of the transform script is saved as transformed snapshot 230.

In other embodiments, an intermediate snapshot may be saved after one or more transform operations. For example, if the execution of each transform operation of a sub-sequence of transform operations is fast, the transform script execution module 340 saves an intermediate snapshot after executing the sub-sequence rather than after each transform operation of the sub-sequence.

FIG. 5 illustrates the process of executing a modified transform script using an intermediate snapshot, according to an embodiment of the invention. The transform script execution module 340 receives a transform script 500. The transform script 500 may have been obtained by modifying the transform script 200 shown in FIG. 2. For example, a developer or tester may make incremental changes to a transform script during development or testing of the transform script. Accordingly, transform script 500 may be obtained as a result of making an incremental change to the transform script 200.

The storage system 100 stores previously executed transform scripts and associates the previously stored transform scripts with intermediate snapshots corresponding to transform operations of the transform scripts. Each intermediate snapshot is associated with a prefix of the sequence of transform operations of the previously executed transform script and is obtained as a result of execution of the prefix of the sequence. A prefix of a sequence is a sub-sequence of consecutive elements that starts with the first element of the sequence. For example, if a sequence comprises transform operations {a1, a2, a3, a4, a5, a6, a7, a8}, examples of a prefix of the sequence are {a1, a2, a3}, {a1, a2}, {a1, a2, a3, a4, a5} and so on since they all start with element a1 and are made up of consecutive elements of the sequence. The sub-sequence made up of the remaining elements of the sequence that follow a prefix are referred to as the suffix of the sequence following the prefix. For example, the sub-sequence {a6, a7, a8} is the suffix following the prefix {a1, a2, a3, a4, a5} and the sub-sequence {a4, a5, a6, a7, a8} is the suffix following the prefix {a1, a2, a3}.

The transform script execution module 340 identifies previously executed transform scripts that match the received transform script 500. In an embodiment, the transform script execution module 340 identifies the transform script 200 that has the largest prefix match with the transform script 500. Accordingly, the transform script execution module 340 compares prefix of the sequence of transform operation of each previously executed transform script with the corresponding prefix of the received transform script 500 and selects the previously executed transform script that has the largest prefix that matches.

In an embodiment, the storage system tracks various versions of a transform script as the transform script is modified. For example, each version of the transform script represents a sequence of transform operations obtained by modifying one or more transform operations of the previous version of the transform script. The storage system identifies the transform script with matching prefix by selecting the previous version of the transform script 500. For example, transform script 500 may be obtained by modifying the transform operations 210*d* and 210*e* of the transform script 200. The sub-sequence of transform operations that occur in the sequence of transform operations of transform script 200 before the set of modified transform operations is the prefix of the transform script 200 that matches the corresponding prefix of transform script 500.

As shown in FIG. 5, the transform script 500 has the prefix 510 comprising the transform operations 210*a*, 210*b*, and 210*c* that match the corresponding prefix of the transform script 200. The suffix 520 comprising the transform operations 210*f* and 210*g* is distinct from the corresponding suffix of the transform script 200. Accordingly, the transform script 200 has a suffix of transform operations 210*c* and 210*d* following the prefix 210*a*, 210*b*, and 210*c* which is different from the suffix 520 of transform script 500 that includes transform operations 210*f* and 210*d*.

The transform script execution module 340 receives a request to execute the transform script 500. The transform script execution module 340 identifies the intermediate snapshot 410*c* that was obtained as a result of execution of the prefix 210*a*, 210*b*, and 210*c* of the transform script 200. The transform script execution module 340 skips the execution of the prefix 510 of the transform script 500. The transform script execution module 340 uses the intermediate snapshot 410*c* and executes the transform operations of the suffix 520 of the transform script 500. The transform script execution module 340 uses the result obtained by this execution as the result of execution of the transform script 500 and saves the result as the transformed snapshot 530.

In an embodiment, given a previously executed transform script 200 and a modified transform script 500, the transform script execution module 340 traverses the sequence of transform operations of transform script 200 and the sequence of transform operations of transform script 500 starting from the first transform operations of each sequence and compares the corresponding transform operations. The transform script execution module 340 identifies the first transform operation Tx of the sequence of the transform operations of transform script 200 that is different from the corresponding transform operation Ty of the sequence of transform script 500. The transform script execution module 340 identifies the transform operation the occurs immediately before the transform operation Tx in the sequence of the transform script 300. The transform script execution module 340 identifies the intermediate snapshot saved after execution of transform operation Tx during execution of transform script 200. The transform script execution module 340 executes the suffix of the sequence of the transform script 500 starting from transform operation Ty and executes the transform operations of the suffix using the data of the identified intermediate snapshot. The transform script execution module 340 provides the result of execution of the suffix as the result of execution of the transform script 500.

Overall Process of Execution of Transform Scripts

Figure 6:
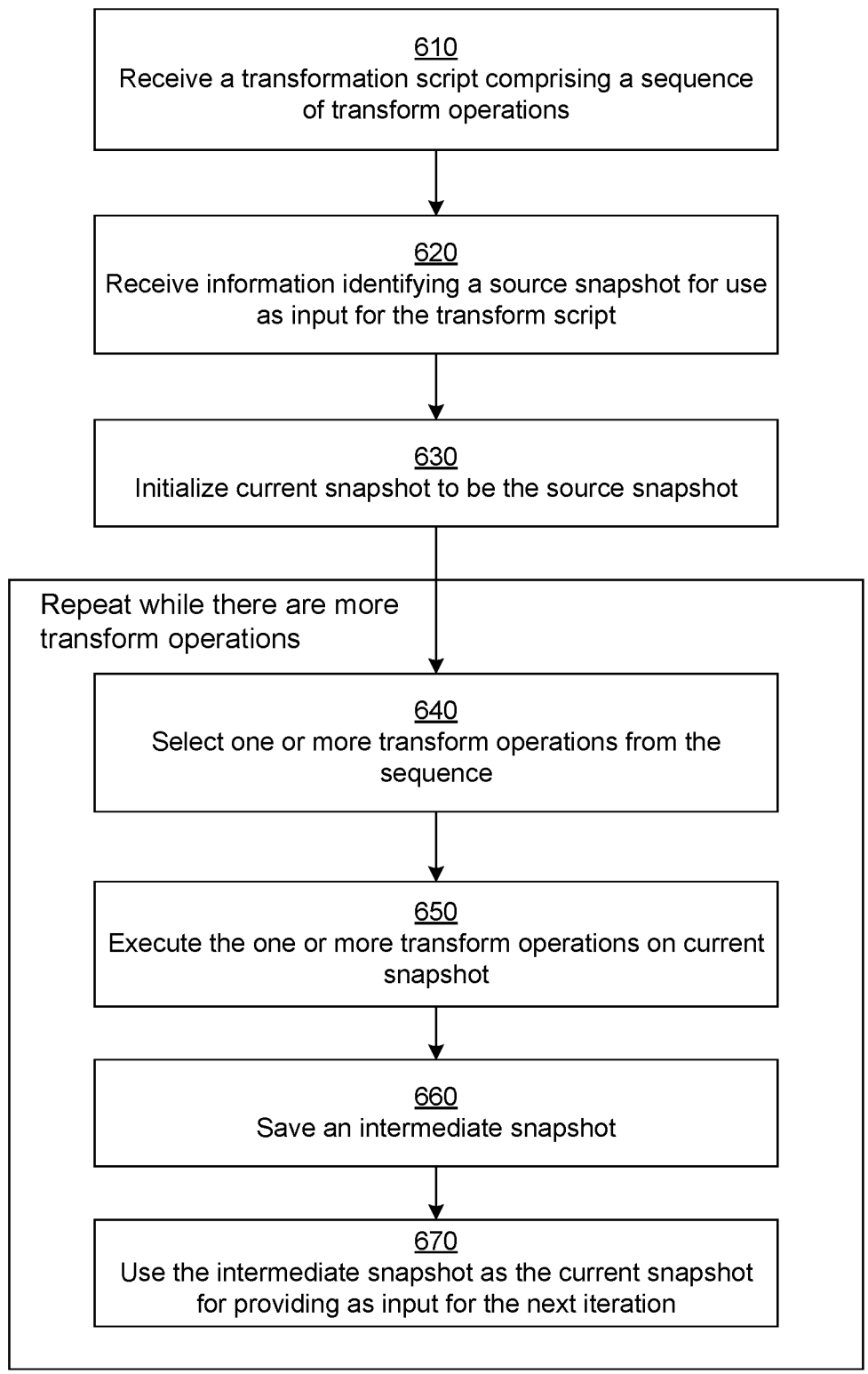
FIG. 6 is a flowchart of a process for executing a transform script that saves intermediate snapshots, according to an embodiment of the invention.
Figure 7:
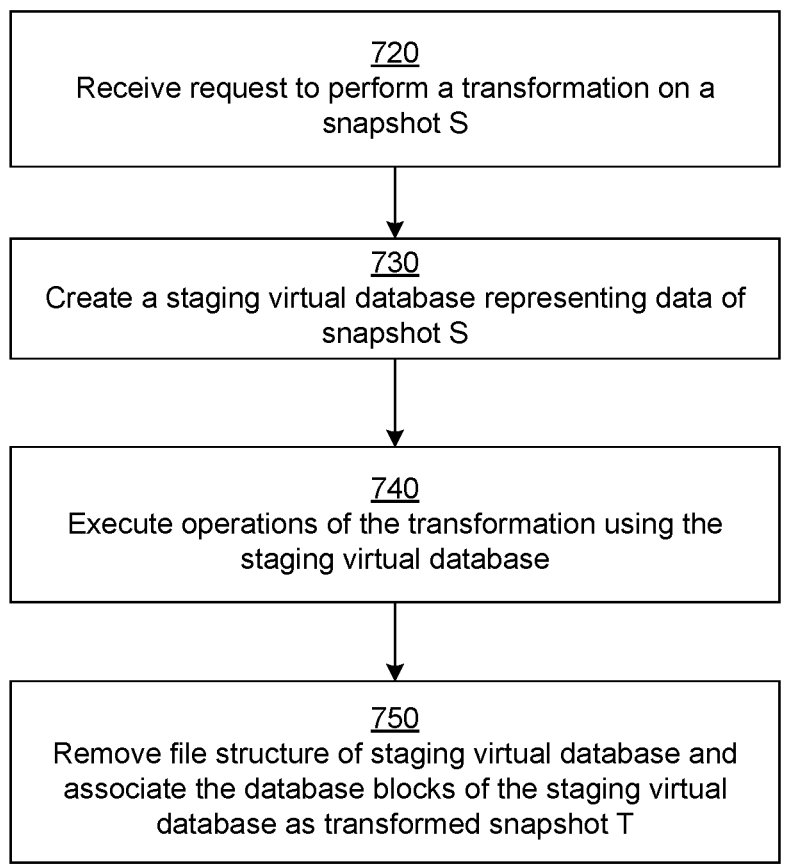
FIG. 7 is a flowchart of a process for transforming a snapshot using a staging virtual database, according to an embodiment of the invention.
Figure 8:
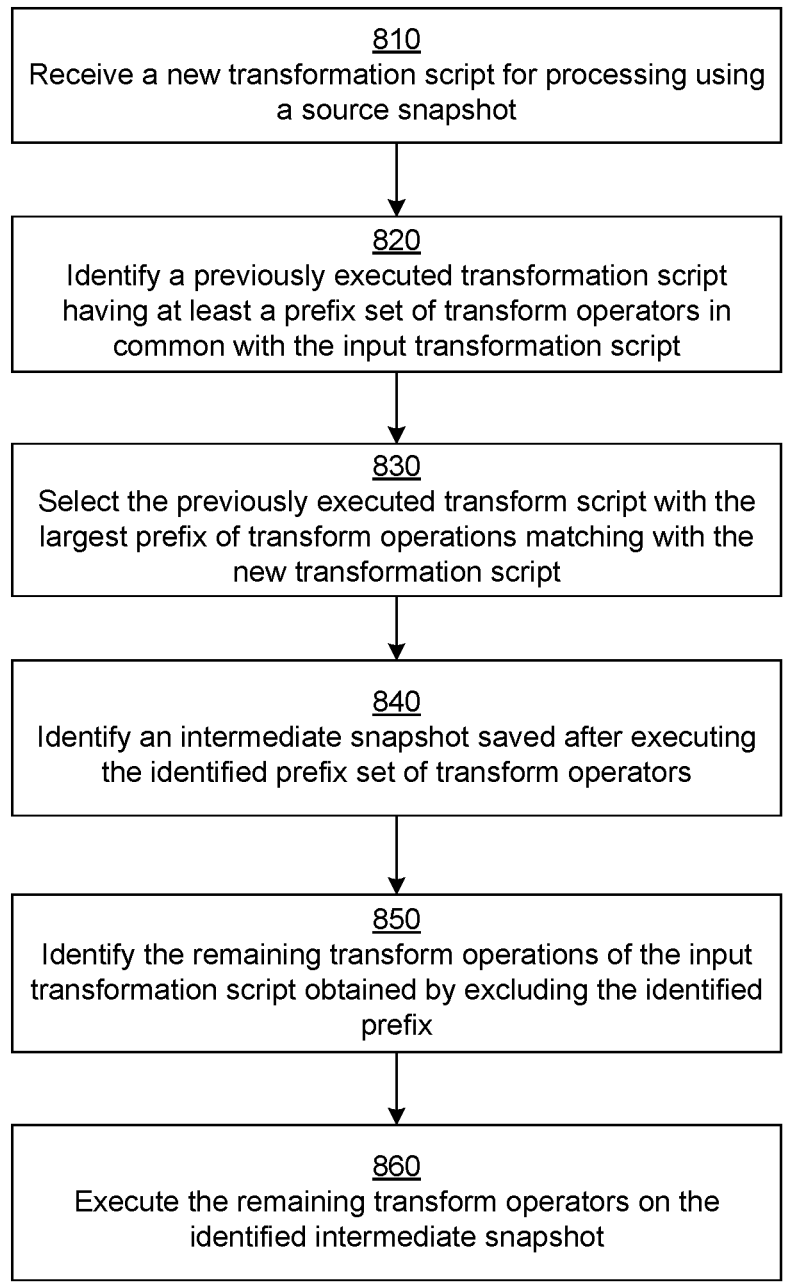
FIG. 8 is a flowchart of a process for executing a modified transform script using an intermediate snapshot, according to an embodiment of the invention.

The steps of each of the processes illustrated in FIGS. 6-8 may be performed in an order different from that shown in the corresponding figure. Furthermore, the steps may be performed by modules different from those indicated herein.

FIG. 6 is a flowchart of a process for executing a transform script that saves intermediate snapshots, according to an embodiment of the invention. The transform script execution module 340 receives 610 a transform script comprising a sequence of transform operations. The transform script comprises a sequence of instructions or transform operations. The transform script execution module 340 receives 620 information identifying a source snapshot for use as input for the transform script.

The transform script execution module 340 executes the transform operations of the script and saves intermediate snapshots representing states of the source snapshot obtained by executing the transform operations. The transform script execution module 340 maintains a current snapshot as representing the state of the source snapshot after processing a prefix of the sequence of transform operations corresponding to the transform script. The transform script execution module 340 initializes 630 the current snapshot to be the source snapshot.

The transform script execution module 340 repeats the execution of the following steps, while there are remaining transform operations in the transform script that haven't been processed. The transform script execution module 340 selects 640 one or more transform operations (or instructions) of the transform script for execution. In the first iteration, the transform script execution module 340 selects the first transform operation for execution. In subsequent iterations, the transform script execution module 340 selects the transform operation following the last transform operation that was executed from the transform script. The transform script may specify the control flow of execution of various transform operations, for example, by specifying loops or jump instructions. The transform script execution module 340 selects the next transform operation according to the control flow specified in the transform script. The transform script execution module 340 executes 650 the selected transform operation.

The transform script execution module 340 saves 660 an intermediate snapshot to capture the state of the data after execution of the selected transform operation. The saved intermediate snapshot represents the state of the data of the source snapshot after execution of the prefix of the transform operations of the transform script starting from the first transform operation of the transform script followed by the executed transform operations until the last executed transform operation. The transform script execution module 340 uses 670 the saved intermediate snapshot as the current snapshot for the next iteration. Accordingly, the intermediate snapshot saved in each iteration is used 670 as the input for the steps of the next iteration including steps 640, 650, 660, and 670.

In an embodiment, the transform script execution module 340 saves an intermediate snapshot after each transform operation of the transform script that is executed. In other embodiments, the transform script execution module 340 saves an intermediate snapshot after executing one or more transform operations since the previous intermediate snapshot was saved. In an embodiment, the transform script includes instructions for saving the intermediate snapshot.

In an embodiment, the transform script execution module 340 determines a metric indicating the amount of processing performed since the last intermediate snapshot was saved. For example, the metric may measure the processing time since the last intermediate snapshot was saved. Alternatively, the metric may count the number of instructions executed since the last intermediate snapshot was saved. If the value of the metric exceeds a predetermined threshold, the transform script execution module 340 saves an intermediate snapshot. Otherwise, the transform script execution module 340 executes the next transform operation.

If a source snapshot stores a data representing a source database, the transformation operations may be specified as database commands. The storage system 100 creates a staging virtual database to interface with the data of the snapshot and performs the transform operations using the staging virtual database. FIG. 7 is a flowchart of a process for transforming a snapshot using a staging virtual database, according to an embodiment of the invention.

The transformation module 380 receives a request to perform a transformation of a snapshot, for example, snapshot S. The transformation module 380 creates a staging virtual database representing data of the snapshot S. The staging virtual database creates a set of files that point at data blocks of the snapshot S. The transformation module 380 performs the requested transformation operations using the staging virtual database. The staging virtual database provides a database interface to the data of the snapshot S. Accordingly, transformation operations including database operations may be performed on the data of the snapshot S. Examples of database operation that can be performed by the storage system on the staging virtual database include data manipulation language (DML) commands specified using a database query language, for example, the structured query language (SQL). These include commands to update a table, insert new rows in a table, delete rows of a table, add new table, delete a table, and so on.

After the transformation module 380 performs the transformations, the transformation module 380 may delete the file structure created for the staging virtual database. Deleting the file structure of the staging database does not affect the data of the transformed snapshot S. The transformation module 380 provides the transformed snapshot S to the system that requested the transformed snapshot.

The process shown in FIG. 7 shows one mechanism for performing transformations of snapshots. The mechanism shown in FIG. 7 is useful if the transformation operations can be expressed as database operations and at least a portion of the data of the snapshot S is stored as a database. In other embodiments, the snapshot S stores data of other types of applications, for example, a backup application and the transformation module 380 creates a file structure of that type of application instead of the file structure of the virtual database. The remaining steps of the process are as illustrated in FIG. 7 and described above.

FIG. 8 is a flowchart of a process for executing a modified transform script using an intermediate snapshot, according to an embodiment of the invention. The transform script execution module 340 receives 810 a new transform script for processing using a source snapshot. The new transform script comprises a sequence of transform operations to be executed on the source snapshot. The transform script execution module 340 identifies 820, a previously executed transform script that matches the transform script received for processing. The transform script execution module 340 identifies 820, a previously executed transform script that has a prefix of the sequence of transform operations matching with the new transform script. Accordingly, a portion of the transform operations of the transform script that occur in the beginning of the sequence of transform operations of the transform script match for the previously executed transform script and the new transform script. The transform script execution module 340 selects 830 the previously executed transform script that has the largest matching prefix of transform operations with the new transform script.

In an embodiment, the transform script execution module 340 compares prefixes of sequences of transform operation corresponding to the previously executed transform scripts with the new transform script. In another embodiment, the transform script execution module 340 tracks different versions of a transform script being edited. For example, a version n+1 of the transform script is obtained by modifying the version n of the transform script, which in turn was obtained by modifying the version n−1 of the transform script, and so on. The transform script execution module 340 selects the previous version of the transform script. The transform script execution module 340 identifies the first transform operation in the sequence of the transform script that was modified. The transform script execution module 340 takes the sub-sequence of transform operations that occur before the identified transform operation that was modified as the prefix of the transform script that is matching.

The transform script execution module 340 identifies 840 an intermediate snapshot that was saved after executing the prefix of the transform script. The transform script execution module 340 may identify the last intermediate snapshot that was saved during the execution of the prefix of the transform script. For example, in some situations, the last intermediate snapshot saved may correspond to a sub-sequence of the matching prefix.

The transform script execution module 340 identifies 850 the remaining transform operations of the transform script that need to be performed after the portion of the sequence of transform operations that were executed before saving the intermediate snapshot. The transform script execution module 340 executes 860 the remaining transform operations of the transform script to obtain the result of execution of the new transform script. Accordingly, the transform script execution module 340 obtained the result of execution of the new transform script by reusing saved intermediate snapshots of previous executions of transform scripts.

Additional Configuration Considerations

Embodiments disclosed herein describe transformation of snapshots. A storage system may create a VDB based on a snapshot. VDBs share data blocks with other VDBs in the same manner that snapshots share data blocks with other snapshots. Accordingly, all techniques disclosed herein for replicating snapshots can be used for transforming data of VDBs. For example, the processes shown FIGS. 6 and 8 can be performed using VDBs instead of snapshots.

A database comprises data stored in a computer for use by computer implemented applications. A database server is a computer program that can interact with the database and provides database services, for example, access to the data stored in the database. Database servers include commercially available programs, for example, database servers included with database management systems provided by ORACLE, SYBASE, MICROSOFT SQL SERVER, IBM's DB2, MYSQL, and the like. A database may be implemented using a database model, for example, a relational mode, object model, hierarchical model or network model.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one. The singular also includes the plural unless stated otherwise.

Upon reading this disclosure, those of skill in the art will appreciate still additional alternative structural and functional designs for a system and a process for creating secure virtual databases from point-in-time copies of source databases stored in a storage manager. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for transforming snapshots, the method comprising:
   storing, in a storage system, a plurality of source snapshots, wherein each source snapshot shares data blocks with one or more other source snapshots;
   receiving one or more transform scripts for transforming data of a source snapshot, each transform script comprising a sequence of transform operations;
   executing the one or more transform scripts, the executing comprising, for each transform script, storing one or more intermediate snapshots, each intermediate snapshot stored after applying one or more transform operations of the transform script to a previously stored intermediate snapshot;
   receiving a new transform script for executing using the source snapshot, the new transform script comprising a new sequence of transform operations;
   identifying a previously executed transform script, the previously executed transform script with a sequence of transform operations having a prefix matching with the new sequence;

17 identifying an intermediate snapshot saved after executing the matching prefix of the identified transform script; and
executing transform operations of the new transform script occurring after the matching prefix using the intermediate snapshot as input to obtain a result of execution of the second transform script.

2. The method of claim 1, wherein identifying the previously executed transform script comprises, selecting a transform script that was modified to obtain the new transform script.

3. The method of claim 2, further comprising:
associating each transform script with a version, wherein identifying the previously executed transform script comprises, selecting a transform script having a version occurring before the version of the new transform script.

4. The method of claim 1, wherein identifying the previously executed transform script comprises:
determining for each of the one or more previously executed transform script, whether the previously executed transform script has a prefix of sequence of transform operations that matches a prefix of sequence of transform operations of the new transform script.

5. The method of claim 4, further comprising:
responsive to determining that a plurality of previously executed transform script match the new transform script, selecting a previously executed transform script having the longest matching prefix.

6. The method of claim 1, wherein executing a transform script comprises:
determining a metric value indicative of an amount of processing performed since a previous intermediate snapshot was saved; and
determining whether to save another intermediate snapshot responsive to the metric value exceeding a threshold value.

7. The method of claim 1, wherein the snapshot stores a plurality of database blocks and the transform script comprises one or more database commands, wherein executing a transform script comprises:
creating a virtual database comprising a file structure pointing at database blocks of the snapshot; and
executing the one or more database commands of the transform script against the virtual database.

8. The method of claim 1, wherein the source snapshot stores data configured to be executed by a first version of an application and the transform script modifies the data of the source snapshot such that the modified data is configured to be executed by a second version of the application.

9. The method of claim 8, wherein the application is a database system.

10. The method of claim 1, wherein the source snapshot stores data configured to be executed by a first application offered by a first vendor and the transform script modifies the data of the source snapshot such that the modified data is configured to be executed by a second application offered by a second vendor.

11. A non-transitory computer-readable storage medium storing instructions for:
storing, in a storage system, a plurality of source snapshots, wherein each source snapshot shares data blocks with one or more other source snapshots;
receiving one or more transform scripts for transforming data of an input source snapshot, each transform script comprising a sequence of transform operations;

18 executing the one or more transform scripts, the executing comprising, for each transform script, storing one or more intermediate snapshots, each intermediate snapshot stored after applying one or more transform operations of the transform script to a previously stored intermediate snapshot;
receiving a new transform script for executing using the source snapshot, the new transform script comprising a new sequence of transform operations;
identifying a previously executed transform script, the previously executed transform script with a sequence of transform operations having a prefix matching with the new sequence;
identifying an intermediate snapshot saved after executing the matching prefix of the identified transform script; and
executing the transform operations of the new transform script occurring after the matching prefix using the intermediate snapshot as input to obtain a result of execution of the second transform script.

12. The non-transitory computer-readable storage medium of claim 11, wherein identifying the previously executed transform script comprises, selecting a transform script that was modified to obtain the new transform script.

13. The non-transitory computer-readable storage medium of claim 12, further comprising:
associating each transform script with a version, wherein identifying the previously executed transform script comprises, selecting a transform script having a version occurring before the version of the new transform script.

14. The non-transitory computer-readable storage medium of claim 11, wherein identifying the previously executed transform script comprises:
determining for each of the one or more previously executed transform script, whether the previously executed transform script has a prefix of sequence of transform operations that matches a corresponding prefix of sequence of transform operations of the new transform script.

15. The non-transitory computer-readable storage medium of claim 14, further comprising:
responsive to determining that a plurality of previously executed transform script match the new transform script, selecting a previously executed transform script having the longest matching prefix.

16. The non-transitory computer-readable storage medium of claim 11, wherein executing a transform script comprises:
determining a metric value indicative of an amount of processing performed since a previous intermediate snapshot was saved; and
determining whether to save another intermediate snapshot responsive to the metric value exceeding a threshold value.

17. The non-transitory computer-readable storage medium of claim 11, wherein the snapshot stores a plurality of database blocks and the transform script comprises one or more database commands, wherein executing a transform script comprises:
creating a virtual database comprising a file structure pointing at database blocks of the snapshot; and
executing the one or more database commands of the transform script against the virtual database.

18. The non-transitory computer-readable storage medium of claim 11, wherein the source snapshot stores data configured to be executed by a first version of an application and the transform script modifies the data of the source snapshot such that the modified data is configured to be executed by a second version of the application.

19. The non-transitory computer-readable storage medium of claim 11, wherein the source snapshot stores data configured to be executed by a first application offered by a first vendor and the transform script modifies the data of the source snapshot such that the modified data is configured to be executed by a second application offered by a second vendor.

20. A computer system, comprising:
   an electronic processor; and
   a non-transitory computer-readable storage medium storing instructions for:
      storing, in a storage system, a plurality of source snapshots, wherein each source snapshot shares data blocks with one or more other source snapshots;
      receiving one or more transform scripts for transforming data of an input source snapshot, each transform script comprising a sequence of transform operations;
      executing the one or more transform scripts, the executing comprising, for each transform script, storing one or more intermediate snapshots, each intermediate snapshot stored after applying one or more transform operations of the transform script to a previously stored intermediate snapshot;
      receiving a new transform script for executing using the source snapshot, the new transform script comprising a new sequence of transform operations;
      identifying a previously executed transform script, the previously executed transform script with a sequence of transform operations having a prefix matching with the new sequence;
      identifying an intermediate snapshot saved after executing the matching prefix of the identified transform script; and
      executing the transform operations of the new transform script occurring after the matching prefix using the intermediate snapshot as input to obtain a result of execution of the second transform script.

\* \* \* \* \*

UNITED STATES PATENT AND TRADEMARK OFFICE
CERTIFICATE OF CORRECTION

PATENT NO. : 10,025,528 B2
APPLICATION NO. : 15/411476
DATED : July 17, 2018
INVENTOR(S) : Hubert Ken Sun, Christopher G. Siden and Kyle Cackett It is certified that error appears in the above-identified patent and that said Letters Patent is hereby corrected as shown below:

In the Claims

Column 17, Claim 1, Line 7, please replace "of the second transform script." with --of the new transform script.--.

Column 17, Claim 5, Line 28, please replace "transform script" with --transform scripts--.

Column 17, Claim 5, Line 30, please replace "having the longest matching prefix." with --having a longest matching prefix.--.

Column 18, Claim 11, Line 20, please replace "of the second transform script." with --of the new transform script.--.

Column 18, Claim 14, Line 36, please replace "transform script," with --transform scripts,--.

Column 18, Claim 15, Line 44, please replace "transform script" with --transform scripts--.

Column 18, Claim 15, Line 46, please replace "having the longest matching prefix." with --having a longest matching prefix.--.

Column 20, Claim 20, Line 20, please replace "of the second transform script." with --of the new transform script.--.

Signed and Sealed this
First Day of October, 2019

Andrei Iancu
*Director of the United States Patent and Trademark Office*